United States Patent [19]

Aiello

[11] Patent Number: 5,018,862
[45] Date of Patent: May 28, 1991

[54] SUCCESSIVE FRINGE DETECTION POSITION INTERFEROMETRY

[75] Inventor: Marc F. Aiello, Pittsburgh, Pa.
[73] Assignee: Aerotech, Inc., Pittsburgh, Pa.
[21] Appl. No.: 564,394
[22] Filed: Aug. 8, 1990

Related U.S. Application Data

[63] Continuation-in-part of Ser. No. 430,568, Nov. 2, 1989, abandoned.

[51] Int. Cl.⁵ .................................................. G01B 9/02
[52] U.S. Cl. ................................... 356/358; 356/345; 356/363
[58] Field of Search ............... 356/345, 346, 353, 358, 356/363

[56] References Cited

U.S. PATENT DOCUMENTS

| | | |
|---|---|---|
| 3,714,607 | 1/1973 | Cutler . |
| 3,788,746 | 1/1974 | Baldwin et al. . |
| 3,905,703 | 9/1975 | Matsumoto ........................ 356/363 |
| 4,166,954 | 9/1979 | Goranson ........................... 356/353 |
| 4,360,271 | 11/1982 | Downs et al. ....................... 356/351 |
| 4,671,656 | 6/1987 | Auth ................................... 356/346 |
| 4,776,698 | 10/1988 | Crosdale ............................. 356/358 |
| 4,819,246 | 4/1989 | Aiello et al. . |

OTHER PUBLICATIONS

"Accuracy Analysis and Improvements to the Hewlett-Packard Laser Interferometer System", C. Steinmetz, R. Burgoon, J. Herris, SPIE vol. 816, Interferometric Metrology (1987) pp. 79-94.

Primary Examiner—Samuel Turner
Attorney, Agent, or Firm—Webb, Burden, Ziesenheim & Webb

[57] ABSTRACT

A stable single-frequency laser interferometer comprises a Michelson interferometer having a power stabilized single-frequency laser and a dual light sensor comprising two closely spaced very small sensor surfaces mounted in substantially the same plane. Devices rotate the plane of the dual light sensor and/or elements of the interferometer to adjust the effective convergent angle of the recombining beams to have a sufficiently large effective convergent angle to promote stability and so that the output signals of the two sensors are in phase quadrature.

16 Claims, 8 Drawing Sheets

SUCCESSIVE FRINGE DETECTION POSITION INTERFEROMETRY

RELATED APPLICATION

This application is a continuation-in-part of application Ser. No. 07/430,568 filed Nov. 2, 1989 and now abandoned, having the same title.

BACKGROUND OF THE INVENTION

This invention relates to a high precision laser interferometer. Laser interferometers are used to measure the movement of precision positioning tables, for example.

Generally speaking, an interferometer is an instrument that measures distances and very small changes in distances by means of the interference of two beams of light. In a laser interferometer, the light source is a laser tube providing a strong coherent monochromatic light beam. In the well known Michelson interferometer, a source of monochromatic light is split (by a beam splitter) into a reference beam and a measurement beam. The reference beam is directed along a fixed path (reference arm) to a light sensor (photodetector). The measurement beam is directed to follow a path that varies with the distance being measured (measurement arm). The two beams are recombined at the beam splitter so as to interfere. The resulting interference is monitored at the sensor. When there is a phase difference between the two recombining beams due to the difference in distances traveled by the beams in the reference and measurement arms, the beams interfere with each other reducing the intensity of the measured signal. The output of the sensor will reach a positive or negative peak each time the distance traveled by the measurement beam increases or decreases by one half wavelength of the monochromatic light being used. The polarity changes are counted to provide a measure of the change in distance.

In the well known double frequency Doppler shift interferometer, the reference beam and measurement beam have frequencies that are slightly different. The changing distance traveled by the measurement beam causes the frequency of the measurement beam at the sensor to change (the Doppler shift). The difference between the source frequency and the Doppler shifted frequency is integrated over time to provide the change in distance itself.

The need for a low cost laser interferometer which is stable over a long period of time in industrial environments is known. Stability in a laser interferometer means that over a long period of time the measurement of a standard distance does not deviate more than an allowed fraction. The search for yet greater and greater stability has led to instruments of greater and greater complexity.

The lack of stability in a Michelson interferometer may be related to the lack of pointing stability in the laser beam and in the lack of mechanical stability of the remainder of the system due to temperature changes in the structure holding the measurement and reference arms. Fortunately, the stability of the frequency and power outputs of the laser itself is not a limiting factor. Extremely stable single-frequency lasers are now available at a reasonable cost. See, for example, U.S. Pat. No. 4,819,246. The stability of laser wavelengths are measured in parts per million per year, say 0.02 to 0.1 ppm/year.

Mechanical instability in the Michelson interferometer structure has the effect of changing the effective lengths of the beam paths as well as changing the degree of overlap and the angles of convergence of the reference and measurement beams at the sensor. Imperfect overlap of the reference and measurement beams at the sensor results in only one or the other of the beams striking a portion of the sensor. Without interference, this portion of the sensor simply produces a DC component in the sensor output. Mechanical instability can change the degree of overlap and therefore the DC component of the sensor output. Since the AC (sinusoidal) component of the interference signal is squared in a single level detector, any drift in the DC component of the signal will change the duty cycle of the squared signal and a sufficient instability will result in loss of the AC component altogether.

As a practical matter, the two beams cannot be made to arrive at the sensor perfectly aligned. Hence, a fringe pattern strikes the sensor where the two beams overlap. The fringe pattern may be considered the result of two collimated beams approaching the sensors at different angles or two divergent beams approaching the sensor along spaced axes or both. If the spacing of the fringe pattern relative to the size of the sensor is insufficient, more than one fringe may strike the sensor at all times. Since the output of the sensor is related to the sum of the intensity of the light over the entire surface of the sensor, the output signal is related to the total number of fringes and factions thereof that strike the sensor. The AC component of the output signal of the sensor can be lost altogether when more than a single fringe strikes the sensor. Decreasing the angle of the convergence of the two beams and/or their spacing, if the beams are divergent, the fringes become more widely spaced. Unfortunately, as will be explained in detail, this actually results in increased instability.

Elaborated systems have been devised to overcome the above-noted problems. For example, the double frequency Doppler shift interferometers measure frequency shifts between a measurement and reference beam thus making them insensitive to fringe contrast and light source intensity. See, for example, U.S. Pat. Nos. 3,788,746 and 3,714,607. Unfortunately, Doppler shift laser interferometers can lose count at speeds easily attained by modern x-y position stages.

Another system based upon the Michelson interferometer uses a single frequency and a complex detection system detecting three different interference signals, one in quadrature with the other two. The three signals are combined in a way to cancel the effects of thermal drift on the DC level of the interference signal. See U.S. Pat. No. 4,360,271.

With an interferometer, two signals in quadrature (90° out-of-phase) must be detected to enable discrimination of the direction of change of the measured distance. Typically, the reference and measurement beams are both split and recombined as two different interference patterns at sensors spaced one quarter of a fringe so that the output signals at each sensor are in quadrature.

SUMMARY OF THE INVENTION

It is an object of this invention to provide a simple single-frequency laser interferometer having superior stability.

It is an object, according to this invention, to provide a practical single-frequency laser interferometer in which fringes are counted as the interference pattern crosses a detector.

It is yet a further object, according to this invention, to provide a method and apparatus for deriving quadrature signals from successive fringes in a single interference patter crossing two closely spaced sensors.

Briefly, according to this invention, a stable laser interferometer comprises a single-frequency Michelson type interferometer. The light source comprises a power (frequency) stabilized single-frequency laser. Preferably, the laser is a helium-neon laser with a wavelength of 632.8 nM and a beam diameter less than 1 mm. As a practical matter, a beam diameter of about 0.5 mm is used and in those embodiments where the beam is collimated, the beam is expanded to have a diameter of about 2.5 mm. Adjustable means are provided for directing the measurement and reference beams to converge on a measurement plane at a large effective convergent angle. By large effective convergent angle is meant an angle large enough or a spacing large enough in the case of divergent beams, or both to provide stability given the particular mechanical system and laser wavelength. The less stable the mechanical system, the larger the effective convergent angle must be. The larger the wavelength, the larger the effective convergent angle must be. For a precision mechanical system constructed with aluminum parts and a helium-neon laser, the effective convergent angle should be at least 0.1 mRad and preferably 0.2 mRad. The effective convergent angle cannot be made arbitrarily large, however, since as the angle is increased, the signal-to-noise ratio reduces and the fringes may become so close together that detectors small enough to detect successive fringes may not be available.

Two or four closely spaced sensors mounted in the same plane are positioned at or about the measurement (interference) plane. If two sensors are used, they are arranged side-by-side. If four sensors are needed, they are arranged in the four quadrants defined by two perpendicular axes. According to one embodiment, the sensors are mounted to be translated in two directions parallel to the measurement plane; and adjustable means are provided to rotate both sensors relative to an axis parallel to the measurement plane (detector tilt). Preferably, the sensors have areas of less that about 1.3 mm square mounted in substantially the same plane less than about 2 mm or center. More preferably, two side-by-side sensors are spaced approximately 1.5 mm on center and are about 1 mm square. Most preferably, quadrant-type sensors have four sensitive areas $1.45 \times 1.45$ mm and are positioned with edges 0.1 mm apart. It is this separation distance (0.1 mm specifically) which determines the actual interference angle to be used.

Preferably, the reference and measurement beams are directed by a beam splitter at right angles to each other. The reference beam is redirected to the beam splitter by a retro prism mounted a fixed distance relative to the beam splitter. The measurement beam is redirected to the beam splitter by a retro prism mounted on the table or other device, the linear movement of which is being measured.

According to one embodiment in which the laser beam is not collimated, at least one of the retro prisms, preferably the retro prism which redirects the reference beam, is mounted for rotation about an axis perpendicular to the incoming beam and preferably is mounted for two degrees of translation along the axis perpendicular to the incoming beam. Retro prisms return the outgoing beam parallel to the incoming beam. Rotation of the retro prism will change the spacing between the incoming and outgoing beam somewhat. This feature may be used to adjust the effective convergent angle between the reference and measurement beams at the sensor. By a combination of adjustments of the effective convergent angle and the angle between the measurement plane and the sensor plane (detector tilt), stability can be achieved and the output signals of the two sensors can be brought into quadrature.

In the case of a laser beam which is not collimated, the change in the length of the measurement arm beam results in a slight change in the effective convergent angle. This can result in a slight deviation from the quadrature condition. The effect of this variation can be further minimized by careful selection of certain parameters. Specifically, the beam diameter should be chosen so that the Rayleigh divergence threshold for the measurement beam arm falls approximately midway between the outer limits of travel of the measurement retro prism. The length of the reference arm should be adjusted to be substantially equal to the length of the Rayleigh divergence threshold.

According to another embodiment, both retro prisms are fixed. The laser beam is collimated and expanded. The beam splitter is arranged for rotation and the sensor is arranged so that the sensor plane is substantially perpendicular to the path of the interfering beams. The convergent angle is adjusted by rotating the beam splitter about its axis perpendicular to the beam paths. The embodiment has the advantage of providing stability up to 40 inches of travel and requiring only a single adjustment to bring about the desired convergent angle.

BRIEF DESCRIPTION OF THE DRAWINGS

Further features and other objects and advantages will become apparent from the following detailed description made with reference to the drawings in which:

FIG. 9b is a section view of a lock nut for securing the retro prism in the socket of FIG. 9a;

DESCRIPTION OF THE PREFERRED EMBODIMENTS

Figure 1:
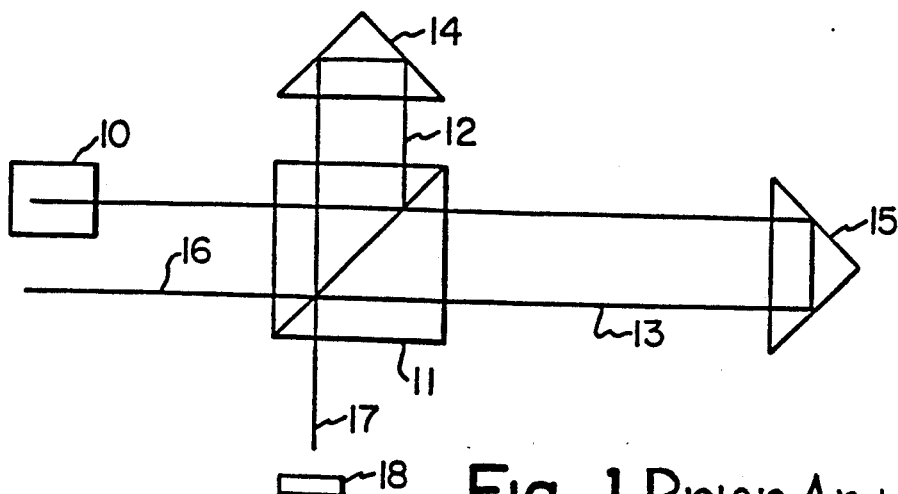
FIG. 1 is a schematic diagram of a single-frequency interferometer without a collimator which is useful for explaining one embodiment of this invention.

Referring to FIG. 1, there is shown schematically a single-frequency (Michelson) laser interferometer without a collimator. For applicant's interferometer, the single-frequency output of the laser 10 is polarized, frequency and power stabilized. It is not collimated for this embodiment of my invention in which divergence of the laser beam is relied upon to establish the effective convergent angle. The beam is directed to a beam splitter 11 where one half of the beam is reflected to form a reference beam 12 and the other half is transmitted to form a measurement beam 13. The reference beam is directed to a fixed retro prism 14 and the measurement beam is directed to a moving retro prism 15 at one end of the distance to be measured. In practice, the retro prisms 14 and 15 should be as perfect as possible. Theoretically, a retro prism has the ability to redirect the outgoing beam parallel to the incoming beam even when the retro prism is rotated due to wobble of the base, for example, the positioning table to which it is mounted. With even the most precision mechanical system, a certain amount of wobble is inevitable.

The interference projections of the reference and measurement beams overlap at the detector 18 located at the measurement plane. In this embodiment of the invention not requiring a collimator, the divergence of the measurement beam results in the enlargement ("blooming") of the measurement beam projection upon the measurement plane as the distance being measured increases. The degree of overlap between the two beams (and the projections thereof) at the detector is somewhat varied. However, it has been found that with up to 12 inches of travel of the measurement retro prism, the blooming of the measurement beam does not adversely effect the functioning of the interferometer. As will be explained hereafter, two sensors upon the detector are positioned to remain within the overlap of the projections of the two beams.

The beams reflected from the retro prisms are recombined at the beam splitter. They form two sets of interfering beams (one transmitted set 16 and one reflected set 17) having identical information. According to this invention, a pair of sensors form a detector 18 and are placed in the path of either set of the interfering beams, usually the reflected beam set since more space is available for mounting sensors at this location.

Since the measurement and reference beams are both diverging and are offset from each other or are not exactly parallel after combination, a fringe pattern is produced on any plane that is substantially perpendicular to the interfering beams. The detector 18 is mounted in a plane that is substantially perpendicular to the interfering beams selected for detection.

It is a feature of retro prisms, which have three orthogonal reflecting surfaces, that rotation or translation of the prism relative to the incoming beam will change the spacing of the incoming and outgoing beams. This feature can be used to space the reference and measurement beams from each other. With this adjustment, the fringe pattern itself can be adjusted.

Preferably, according to this invention, the fringe pattern is adjusted or rotated so that the fringes of the pattern are more or less perpendicular to a plane defined by the reference and measurement beam paths. The reason for this orientation of the fringe pattern relates to the typical application of the interferometer according to this invention in which it is used to track a positioning table which moves back and forth in the direction of the measurement beam as it emerges from the beam splitter, which table has a surface that is generally parallel to the plane defined by the reference and measurement beam paths (herein the "beam plane"). Typically, positioning tables are most stable against rotation about an axis perpendicular to the surface of the table and least stable against rotation about an axis lying within or parallel to that surface. The fringe pattern orientation, as preferably described, is least effected by the most likely rotation (an undesirable rotation to be sure).

The correct orientation of the fringe pattern is achieved as follows: the polarization of the laser beam is rotated so that it is in a plane parallel to the beam plane and the surface of the positioning table. The reference retro prism is then translated so that the projections of the reference and measurement beams at the measurement plane form an overlap that is approximately an ellipse (somewhat boat shaped) with its long axis parallel to said plane. With this adjustment, the fringes will be more or less perpendicular to the long axis of the overlap and will move parallel to that axis. Of course, the sensor pair is mounted so that a fringe successively crosses one and then the other sensor.

The development of the interference pattern will now be explained with reference to FIG. 2a for two nondiverging waves intersecting at an angle $\phi$. Dashed line A is parallel to the reference beam and is known as the interference axis. Dashed line B is parallel to the measurement beam and the motion of the stage carrying the measurement retro prism. The convergent (interference) angle is labeled $\phi$. The crests of two plane waves with wavelengths $\lambda$ intersecting at the sensor plane SP result in a fringe pattern. The intensity of the fringe pattern is sinusoidal with a period $\Delta x$ as shown in the top portion of FIG. 2a.

Figure 2A:
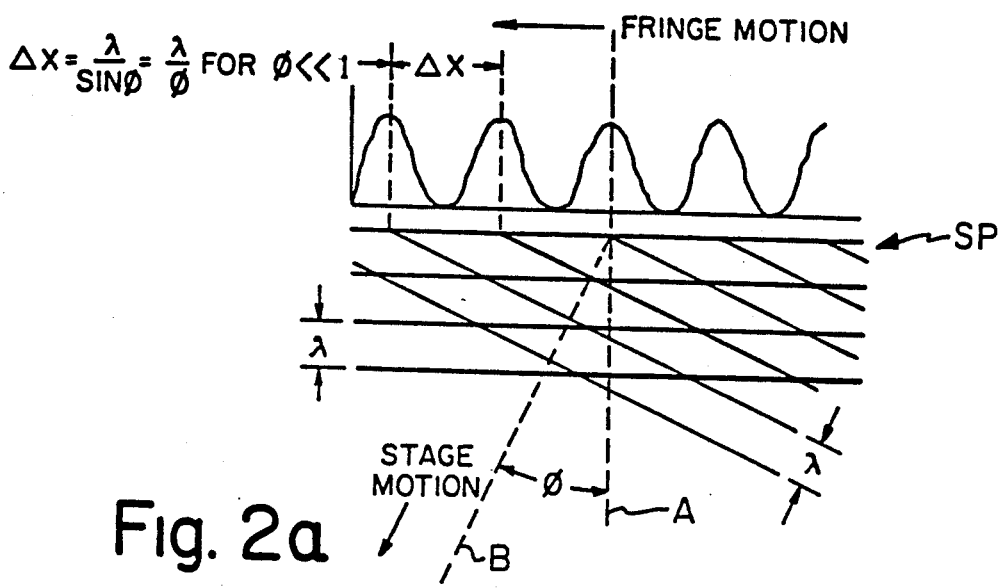
FIG. 2a illustrates the development of an interference pattern with the interferometer according to FIG. 1 on the basis of convergent plane waves.
Figure 2B:
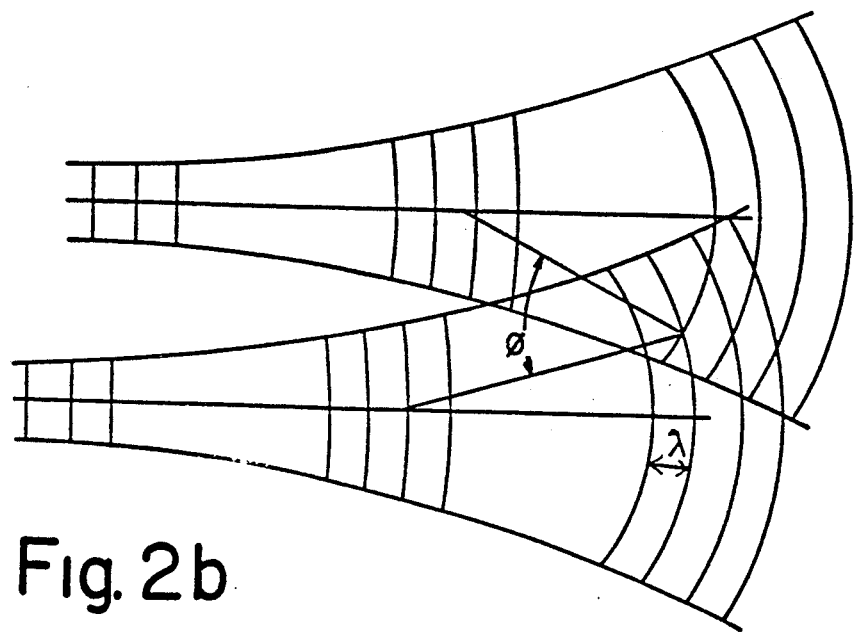
FIG. 2b illustrates the development of an interference pattern with the interferometer according to FIG. 1 on the basis of offset diverging beams.

FIG. 2b illustrates the interference of two offset diverging beams wherein the wavefronts are spherical. It should be apparent that an effective convergent angle $\phi$ results in interference much the same as explained with reference to FIG. 2a.

The intensity of the resulting fringe pattern caused by the interference of two plane waves can be described by the relationship:

$$I(x, \Delta L) = I[1 + \cos(2\pi\phi X/\lambda + 4\pi\Delta L/\lambda)] \quad \text{(equation 1)}$$

Note that the argument of the intensity function contains both a spatial description of the fringe (function of x) and a description of how the period shifts (propagates) as the path difference in the axes of the interferometer is changed (function of $\Delta L$). Setting the spatial component of the intensity function equal to $2\pi$ yields the fringe period as a function of $\phi$:

$$\Delta x = \lambda/\phi \quad \text{(equation 2)}$$

The term $\phi$ is the interference angle between the plane waves as they interfere (see FIG. 2a). This angle defines the fringe pattern period $\Delta x$. The smaller the angle, the greater the distance between fringe maxima or minima. When $\phi = 0$, complete addition/cancellation occurs. This is the effect often strived for but never achieved in single-frequency interferometers not according to this invention.

The propagation component defines the resolution of the interference pattern: that is, the function between path difference ($\Delta L$) and how the fringes shift or propagate with respect to a stationary reference next to the fringe pattern. Setting this argument component equal to $2\pi$ yields the resolution of the interferometer:

$$\Delta L = \lambda/2 \quad \text{(equation 3)}$$

Thus, for each half wavelength of arm movement, a complete fringe cycle (maxima intensity to maxima intensity or minima intensity to minima intensity) will occur. For an interference pattern defined by the condition of $\phi = 0$, the maxima and minima is simply a transition from complete dark to an intensity equal to the sum of the beams no matter which direction (increasing or decreasing) the path length is changed. An interesting condition occurs as the interference angle $\phi$ is adjusted from the zero value. The effect is shown in FIG. 2a. A fringe pattern is developed in which the fringe maxima and minima are spaced as defined by equation 2. However, the direction of movement can be noted by the direction in which the fringe propagates. As the phase fronts of one beam (say the measurement beam) move due to the movement of one mirror, their intersection with the phase fronts of the reference beam (stationary mirror), which defines the interference pattern, will propagate in a particular direction. By counting the fringes and noting their direction of movement, distance and direction can be determined. Therefore, all the information required for position interferometry is contained in a single interference pattern.

An unwanted fringe movement can occur if the interference angle $\phi$ is also made to change. Note that the spatial propagation will cause the fringe pattern to expand from the reference point determined by the intersection of the beam axes. Thus, developing quadrature signals from fringes spaced by multiples of the fringe period $\Delta x$, allows significant sensitivity to errors caused by the drift of $\phi$. It is a feature, according to this invention, to develop the quadrature signals from a single fringe.

The cost of single-frequency interferometry (fringe counting) is considerably less expensive than two frequency (Doppler) counterparts. However, since the single-frequency instruments rely on direct cancellation at the optical frequency, they suffer from susceptibility to fringe pattern drift. This drift susceptibility usually effects the interferometers ability to accurately detect direction more so than its ability to count fringes. As mentioned before, quadrature signals (signals that are 90° out-of-phase) are required to differentiate direction. Therefore, the stability of the fringe pattern is necessary for application to position feedback.

In order to understand this sensitivity, note that a 1 mm fringe period ($\Delta x$) translates from equation 2 to 0.6 mRad of beam intersection. Typical warm-up drift of most helium-neon lasers are on the order of 0.2 mRad and possess pointing stabilities of 0.03 mRad/° C. Thus, if one is attempting to generate quadrature signals from a pinhole detection method, the phase of these signals could change dramatically over changes in temperature. Other methods of quadrature detection such as the use of lossy beam splitters would also be susceptible to beam misalignment.

The most serious problem related to application of single-frequency, fringe-counting techniques is fringe drift due to beam alignment changes. These changes can be the result of temperature changes, which result in misalignments of the optics or angular drift of the laser beam, as well as mechanical misalignment over the measurement range caused by cosine or Abbe' errors. In quadrature detection methods, such errors can effect the ability to detect direction as well as distance moved.

As will be demonstrated by the following analysis, the DC components of any fringe detection method are theoretically constant and dependent only on the intensity of the fringe pattern. The intensity of an interference pattern will remain relatively constant with the application of any single-frequency stabilized source. The component of the fringe which can be extremely unstable, depending on the operating conditions, is the spatial component ($\Delta x$) described by equation 2 and physically depicted by FIG. 2a.

Figure 3:
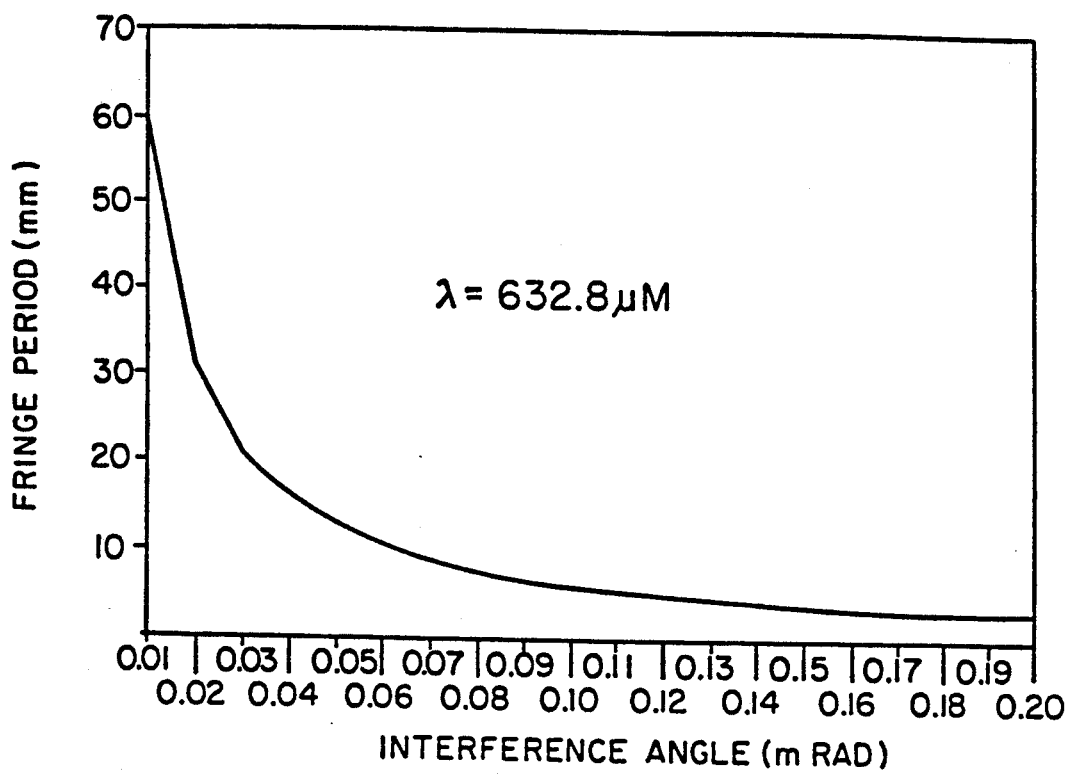
FIG. 3 illustrates the fringe spatial function with change of convergent angle for the interferometer of FIG. 1.
Figure 4:
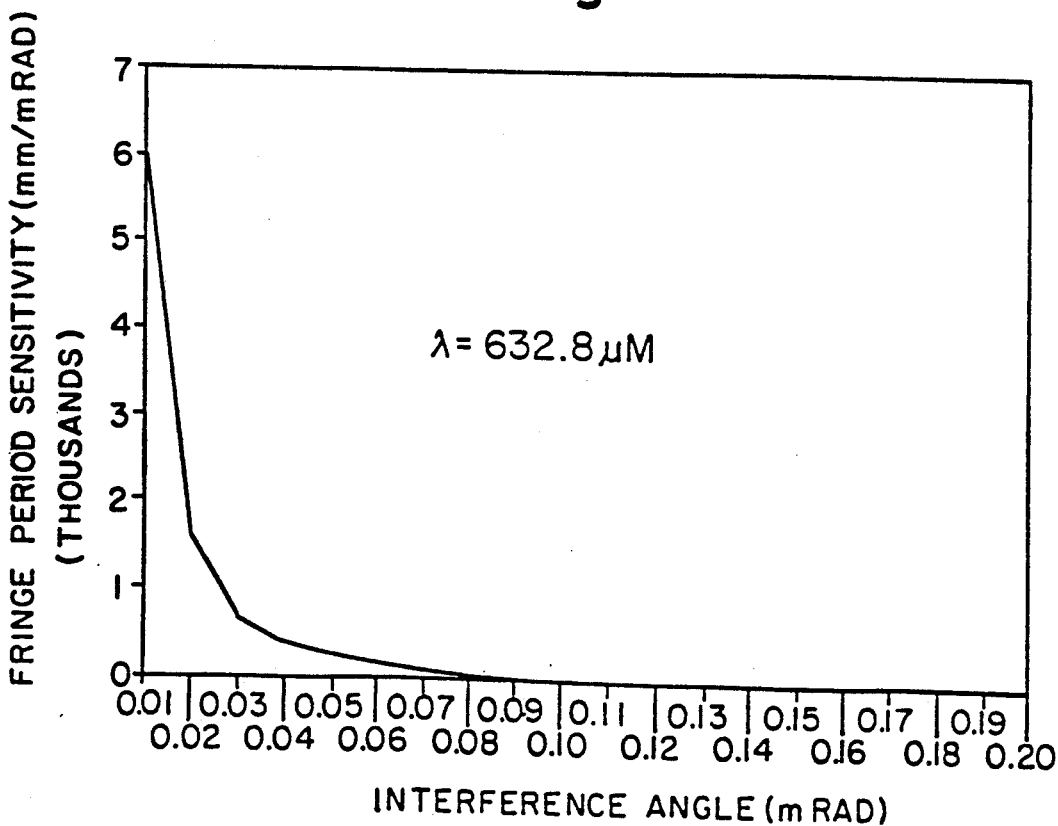
FIG. 4 illustrates the fringe spatial sensitivity to convergent angle of the interferometer of FIG. 1.

FIG. 3 is a plot of equation 2 with respect to the interference angle $\phi$. FIG. 4 is a plot of the first derivative of equation 2 with respect to $\phi$. This plot can be considered as a "Figure of Merit" for fringe-counting interferometers because it describes fringe stability for a particular interference angle and operating wavelength.

Note that operation at interference angles less than 0.1 mRad yields extreme sensitivities of spatial fringe propagation for changes in interference angles (on the order of 7 meter/mRad). It is obvious that operation at complete wavefront cancellation is nearly impossible. Even operation at relatively small angles, (0.02 to 0.1 mRad) and the consequently large distance required between quadrature detectors, results in a system highly susceptible to drift. From FIG. 4, interference angles around 0.2 mRad appear preferable. From FIG. 3, a 0.2 mRad interference angle would produce a fringe separation of about 3 mm.

The problem still remains to develop a detection scheme that can develop quadrature signals from successive fringes at an operating angle of around 0.2 mRad. Developing these signals from successive fringes has two benefits: 1) Detection could be accomplished at the intersection of the beam axes, and thus minimize the effect of spatial propagation due to slight changes in interference angle $\phi$; 2) Quadrature detection can be accomplished from a single fringe for improved simplicity and stability.

Figure 5A:
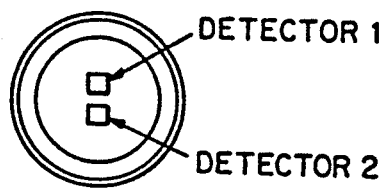
FIGS. 5a and 5b illustrate a light sensor suitable for the practice of this invention.
Figure 5B:
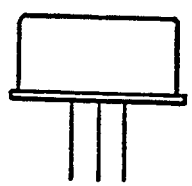

A dual PIN detector manufactured by Hamamatsu was located which fulfills the operating conditions just described. The dual detector is housed in a single TO-39 case. Its physical configuration is shown in FIGS. 5a and 5b. Two 1 mm×1 mm×0.35 mm spaced detectors commoned at the anodes comprise the dual detection scheme.

Figure 6:
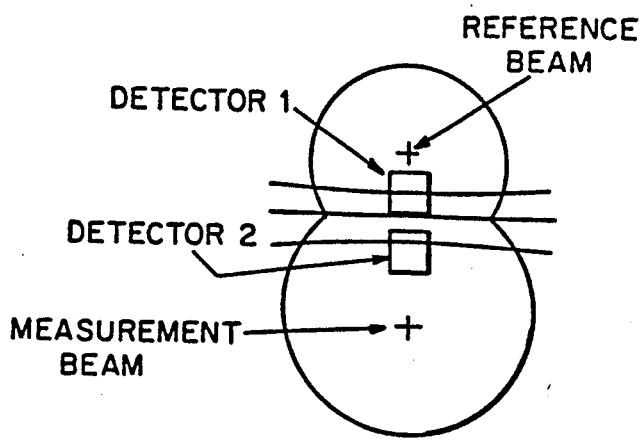
FIG. 6 illustrates the partial overlap of the converged measurement and reference beams upon the light sensor and the formation of a single fringe pattern in the overlap.
Figure 7:
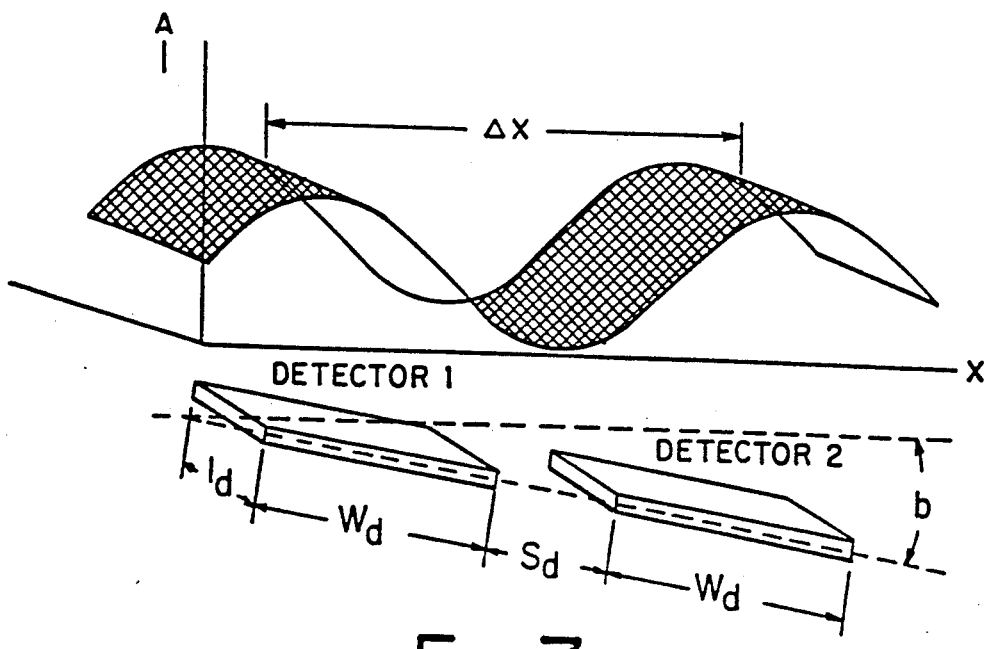
FIG. 7 schematically illustrates successive fringe detection with the light sensor of FIGS. 5a and 5b according to this invention and the adjustment of angle b (detector tilt) to achieve signals in quadrature.

FIGS. 6 and 7 depict the dual elements as they might be in relation to the intensity profile of a fringe pattern. To understand how quadrature signals can be derived from such a detector requires the following analysis.

The current signals generated from detectors 1 and 2 under a fringe pattern, such as that shown in FIG. 7, can be derived by integrating the intensity function of the fringe over the active area of the detectors. Current generated from each detector is then the average intensity times the detector area times the responsivity of the detector (typically 0.4 A/W at 632.8 nM) Evaluating equation 1.2 (as a function of x only) over the limits shown in FIG. 7 yields the detector currents.

$$I_1 = RL_d \hat{I} \int_0^{w_d \cos(b) + x} (1 + \cos(A)) dx \quad \text{(equation 4)}$$

$$I_2 = RL_d \hat{I} \int_{(w_d + s_d)\cos(b) + x}^{(2w_d + s_d)\cos(b) + x} (1 + \cos(A)) dx \quad \text{(equation 5)}$$

where:
$A = 2\pi\phi X/\lambda$.

Note that the limits of integration take into account detector tilt (b), which will be shown later to provide a useful degree of freedom in establishing 90° phase shift between the two signals.

Evaluation of equations 4 and 5 yields:

$I_1 = RL_d\hat{I}(w_d\cos(b)+(\sin(A(w_d\cos(b)+x))-\sin A(x-))/A)$     (equation 6)

$I_2 = RL_d\hat{I}(w_d\cos(b)+(\sin(A((2w_d+s_d)\cos(b)+x))-\sin(A((w_d+s_d)\cos(b)+x)))/A)$     (equation 7)

Analysis of equations 6 and 7 shows that the detector parameters $s_d$ is to be most critical in controlling the phase relationship between $I_1$ and $I_2$. Parameters $w_d$ and $L_d$ only effect the average value and depth of modulation of the signals. Note that equations 6 and 7 both contain the DC terms:

$R\hat{I}L_d w_d \cos(b)$ which are independent of $\phi$. This is the case with all pinhole detection systems. In practice, this term has been found to stay constant within +/−10% over a 12 inch travel. The equations above describe the dual detection system illuminated entirely by the fringe pattern. In practice, this is difficult to achieve with the size of the detector used unless detection is accomplished at a considerable distance from the pattern, or the pattern is expanded with a lens system. It has been found that detection close to the fringe source without the use of expanding optics produces adequate results.

The interference pattern developed across the dual detectors is accomplished by overlapping the reference and measurement beams. (See FIG. 6.) This is required since the Gaussian beam fronts become spherical at distances from the beam waist. This waist, or point of planar wavefront, occurs at the collimating surface of the laser output mirror. As the beams propagate, the beam diameters increase and the phase fronts increase in degree of radius. The resulting interference pattern at the intersection of the beams is therefore somewhat curvilinear. Due to the integrating nature of the detection technique, this less than ideal pattern proves to have little effect on detection performance.

The successive fringe detection technique therefore provides a considerably smaller and less complex alternative to other systems, which goes to great lengths in cancelling the DC component. All that is required in the successive fringe technique disclosed herein is a simple biasing technique to offset the DC components.

The phase and magnitude of the detection signals can be controlled by adjustments to the beam interference angle $\phi$ and detector tilt angle b. In practice, adjustments to both are required. It was found that adjustments to $\phi$ were nicely accomplished by adjusting the tilt of the reference mirror retro prism 14. Rotation of the sensor 18 will vary the detector tilt angle b. Note from equations 6 and 7 that changes to the detector tilt angle b have nearly the same effect as actual changes to the separation parameter $s_d$ which is a part of the detector and cannot be changed.

Figure 8:
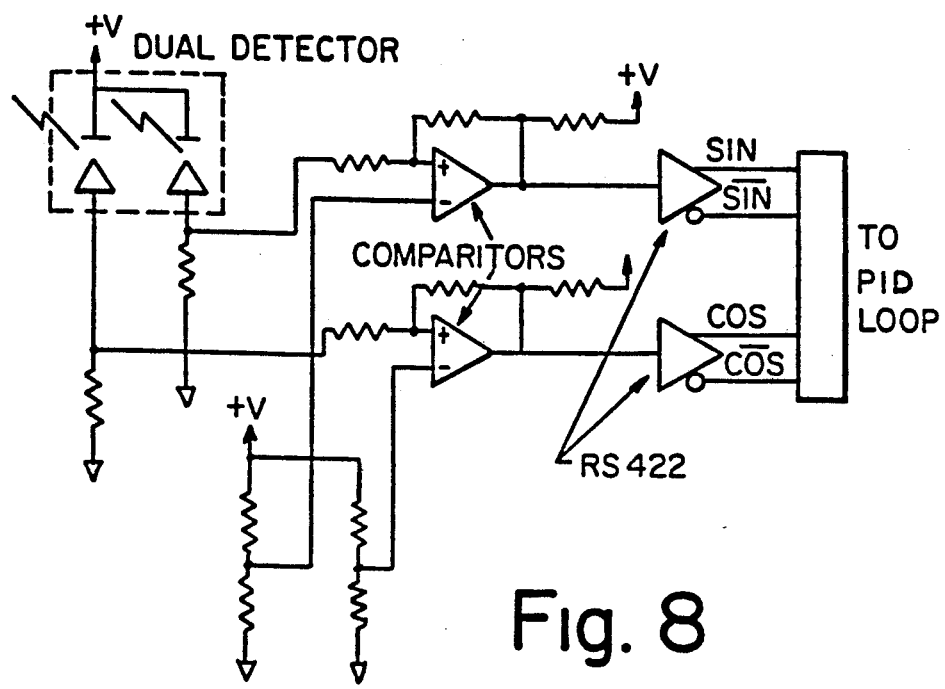
FIG. 8 schematically illustrates a circuit for detecting the output of the light sensors and applying same to a conventional up/down counter for a PID control loop.
Figure 9A:
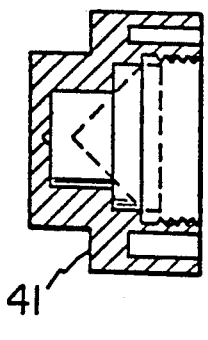
FIG. 9a is a section view of the socket for receiving the reference retro prism.
Figure 9B:
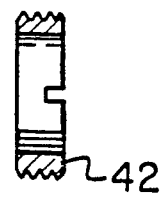
Figure 9C:
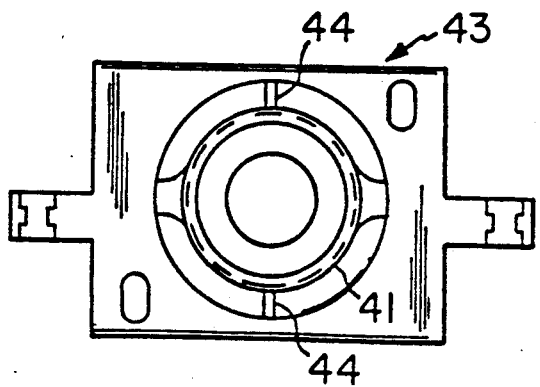
FIG. 9c is a front view of a first frame to which the socket is secured by springs.
Figure 9D:
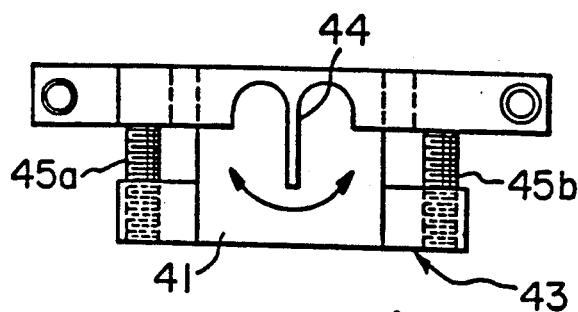
FIG. 9d is a top view of the first frame.
Figure 10:
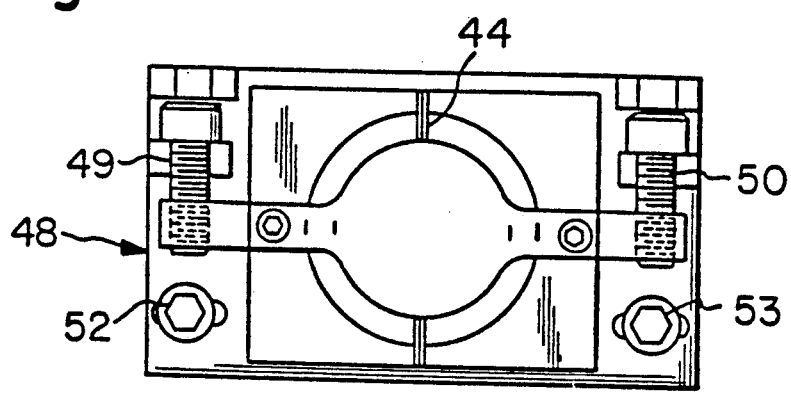
FIG. 10 is a back view of the socket and first frame mounted within the second frame.

Once the proper signals are available from the dual detectors, they can easily be processed for direct input to a PID loop using the circuit shown in FIG. 8. Note that this circuit utilizes comparators directly coupled to the photodetectors and does not require the complex bandwidth limited amplifiers as taught by the other techniques. The circuit shown, when properly designed, is capable of bandwidths in the 10's of megahertz. This would translate to linear speeds greater than 3 m/sec for the interferometer described.

With times four multiplication, the basic resolution of the interferometer is less than 0.1 μm. Further reductions in resolution can be accomplished by an A/D conversion and subsequent processing of the SIN or COS signals present at the inputs to the comparators.

The dual detector can also be mechanized by the close proximity of two small diameter fiber optics. This also may provide two advantages: First, the detection electronics could be located in a remote location free of electrical interference and also provide for reduced package size. Secondly, (and most importantly) the dual detectors could be mechanized in much smaller dimensions so as to take advantage of operating the interferometer with larger and consequently more stable interference angles.

As already explained, it is necessary to adjust the position and orientation of a retro prism. Any number of mounting schemes are possible. Consider that the retro prism is a regular pyramid with the angles at the apex of the three sides equal to 90°. The sides' faces comprise reflecting surfaces. A beam entering the prism through the base will, in theory, be redirected back out of the base parallel to the incoming beam irrespective of the orientation or position of the altitude of the prism. In fact, no retro prism is perfect.

Referring now to FIGS. 9a to 9d and FIG. 10, a suitable mounting means for the reference retro prism comprises a socket 41 into which the prism is inserted and a locking nut 42 inserted also for holding the prism in the socket. The socket is integral with a first frame 43 being joined by springs 44 that provide for rotation relative to the frame. In other words, the socket, first frame and springs comprise one mechanical piece (see FIG. 9d). Rotation of the socket relative to the first frame is caused by adjusting and locking screws 45a, 45b which thread through wings attached to the socket and which bear upon the first frame. The first frame 43 is itself mounted to a second frame 48 by set screws 49, 50 that are threaded in the second frame and bear upon the first frame. These set screws enable the adjustment of the first frame relative to the second frame. This adjustment provides for x-direction movement of the reference retro prism. The second frame is itself slidably mounted for slight movement in the y-direction by locking screws 52, 53 which engage the positioning stage.

Figure 11:
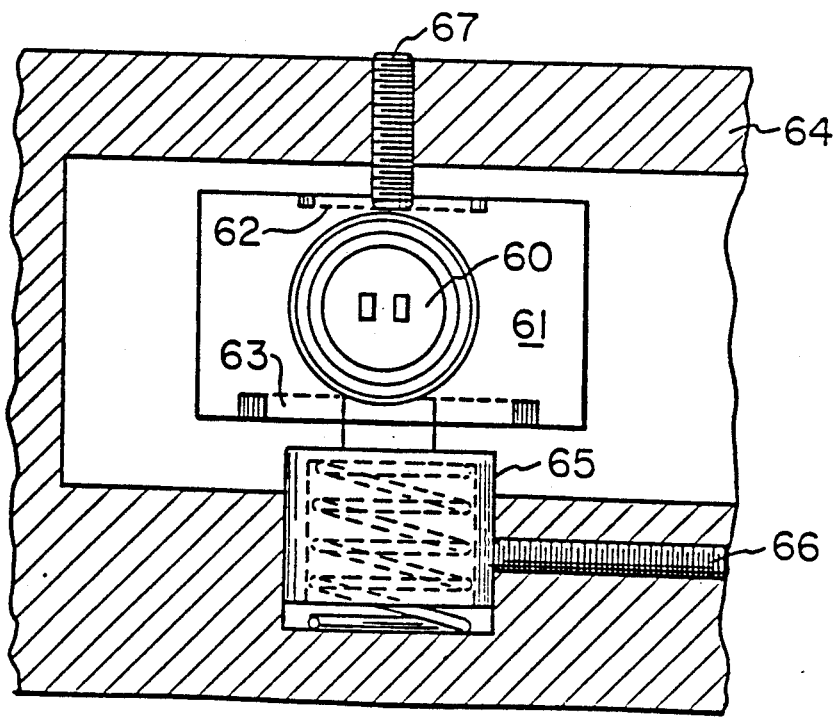
FIG. 11 is a front view of a frame for mounting the dual sensor for adjustment.

The dual detector must also be mounted for rotation and preferably for translation. Referring to FIG. 11, the dual detector 60 is mounted in a block 61. The block is provided with top and bottom slideways 62 and 63. The block 61 is pivotally and slidably secured in the frame 64 by a spring biased pivot pin that enters the slot 62 and an adjusting set screw 65 that enters the slot 63. The frame 64 is secured to the positioning stage. Locking set screw 66 secures the pivot pin 65 against rotation once the necessary adjustments have been made. Set screw 67 controls the vertical position of the dual detector. The horizontal position can be adjusted by backing off set screws 67 and sliding the block 61 to one side or the other.

As already mentioned, any number of schemes for securing the reference retro prism and the dual detector for adjustments are possible. Indeed, a further improvement to be explained later would be to mount the beam splitter, the dual detector and the reference retro fitter all in one unit attached to the end of the laser tube. The laser tube is, of course, fixed relative to the stage (the stage is the frame which carries the motor, the positioning screw and slide bars to which the positioning table is slidably engaged). Linearly positioning stages with which the interferometer, according to this invention, may be used are old in the art and form no part of this invention.

To minimize the slight deviation from the quadrature condition in the uncollimated laser case, it is desirable to select certain parameters as follows: the beam size should be selected so that the Rayleigh divergence threshold for the measurement arm beam falls approximately at the midpoint of the travel of the measurement retro prism. The fixed length reference arm is set at about the Rayleigh threshold.

The Rayleigh threshold is a function of the initial beam radius and wavelength according to the following formula:

$$Z_0 = \frac{\omega_0^2 (\pi)}{\lambda}$$

where $\omega_0$ is the initial beam radius and $\lambda$ is the wavelength. For a beam radius of $0.26 \times 10^{-3}$ meters and a helium-neon laser ($\lambda = 632.8 \times 10^{-9}$) the Rayleigh threshold calculates to 0.335 meters.

Further improvements to the interferometer described are accomplished by collimating (expanding) the spot size of the laser source beam. This can be accomplished with a set of lenses configured in a Keplerian or Galilean arrangement. With reference to FIG. 1, the collimator is placed along the beam path between the laser 10 and the beam splitter 11. The effects are twofold: First, the expanded beam diverges less than the uncollimated beam and thus enables more uniform interference at the detector. This improves the stability of the fringe pattern over considerably larger distances and, in fact, permits stability over distances of about 40 inches. Secondly, the resulting larger beam interference at the detector encompasses the dual detectors more efficiently, thus providing more fringe detection stability. The convergent angle is then adjusted by rotating the beam splitter 11 about its axis perpendicular to the beam paths.

Figure 12:
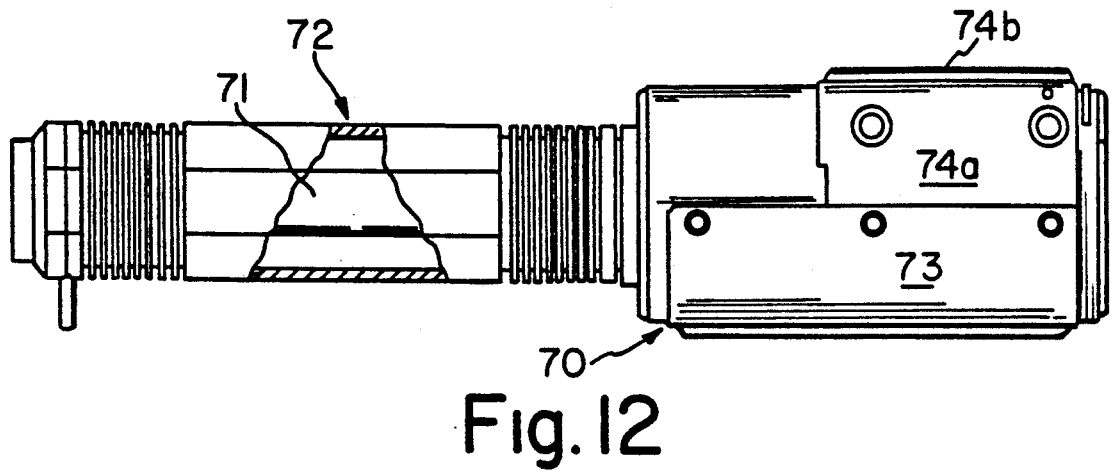
FIG. 12 is a broken away side view of the self-contained single-frequency interferometer unit with a collimator exclusive of the measurement retro reflector according to the teaching of this invention.
Figure 13:
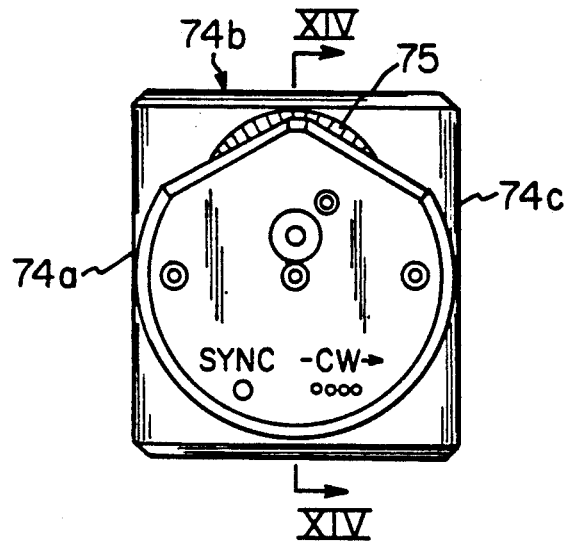
FIG. 13 is an end view of the self-contained unit shown in FIG. 12.

Referring to FIG. 12, a self-contained laser interferometer comprises a base block 70 to which is mounted a laser tube 71 within a protective housing 72. Also mounted to the base block is a housing 73 for the electronics associated with the interferometer. The only part of the interferometer that is not mounted to the base block or within the housings associated therewith is the measurement arm retro reflector. The base block 70 has three sides 74a, 74b, 74c that are precision machined for mounting to a frame or fixed portion of a positioning table assembly or the like. The measurement arm retro reflector would be mounted on the traveling table. FIG. 13 is an end view of the base block 70 which has a shutter 75 mounted thereon which prevents the measurement beam from passing, which permits only the portion of the beam traveling toward the measurement retro prism to pass, or which permits that beam and the return portion to pass. The shutter is useful in the mounting and adjustment of the interferometer.

Figure 14:
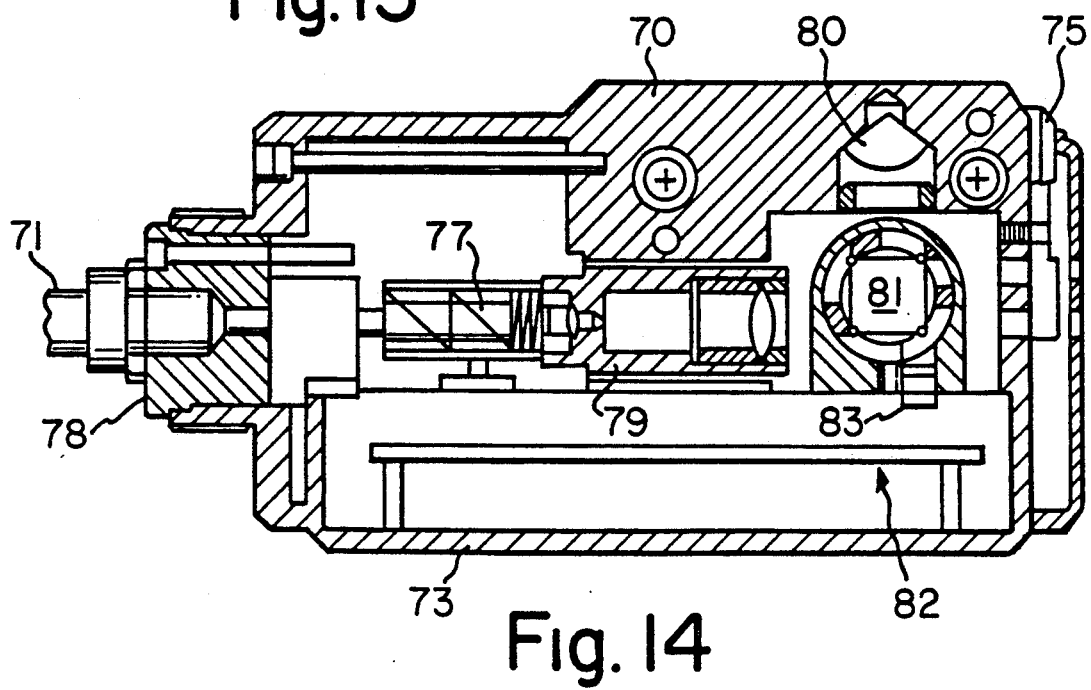
FIG. 14 is a section view through a portion of the self-contained unit along the lines XIV—XIV in FIG. 13.

Referring to FIG. 14, the laser tube 78 is secured to the base block 70. A beam sampler 77 is arranged to sample the power level of the beam for the purpose of stabilizing the frequency of the laser beam. A times five collimator 79 is mounted in the base block along the beam path. A retro reflector 80 is mounted in the base block for returning the reference beam. A beam splitter 81 is mounted for slight rotation relative to the base block. The sensors 83 are mounted to rotate with the beam splitter. A circuit board 82 is mounted within the housing 73.

Figure 15A:
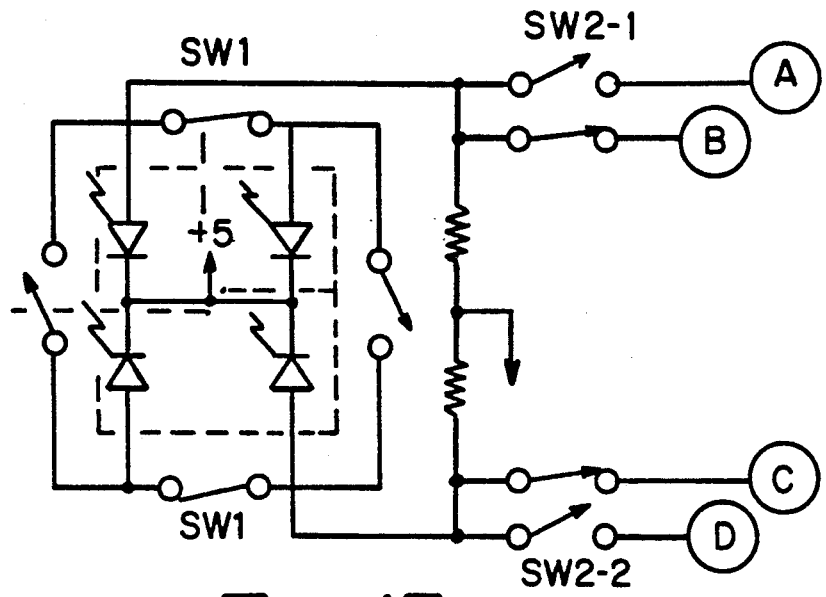
FIG. 15a and 15b comprise diagrams illustrating the quad light sensor circuit for the interferometer according to FIG. 12.
Figure 15B:
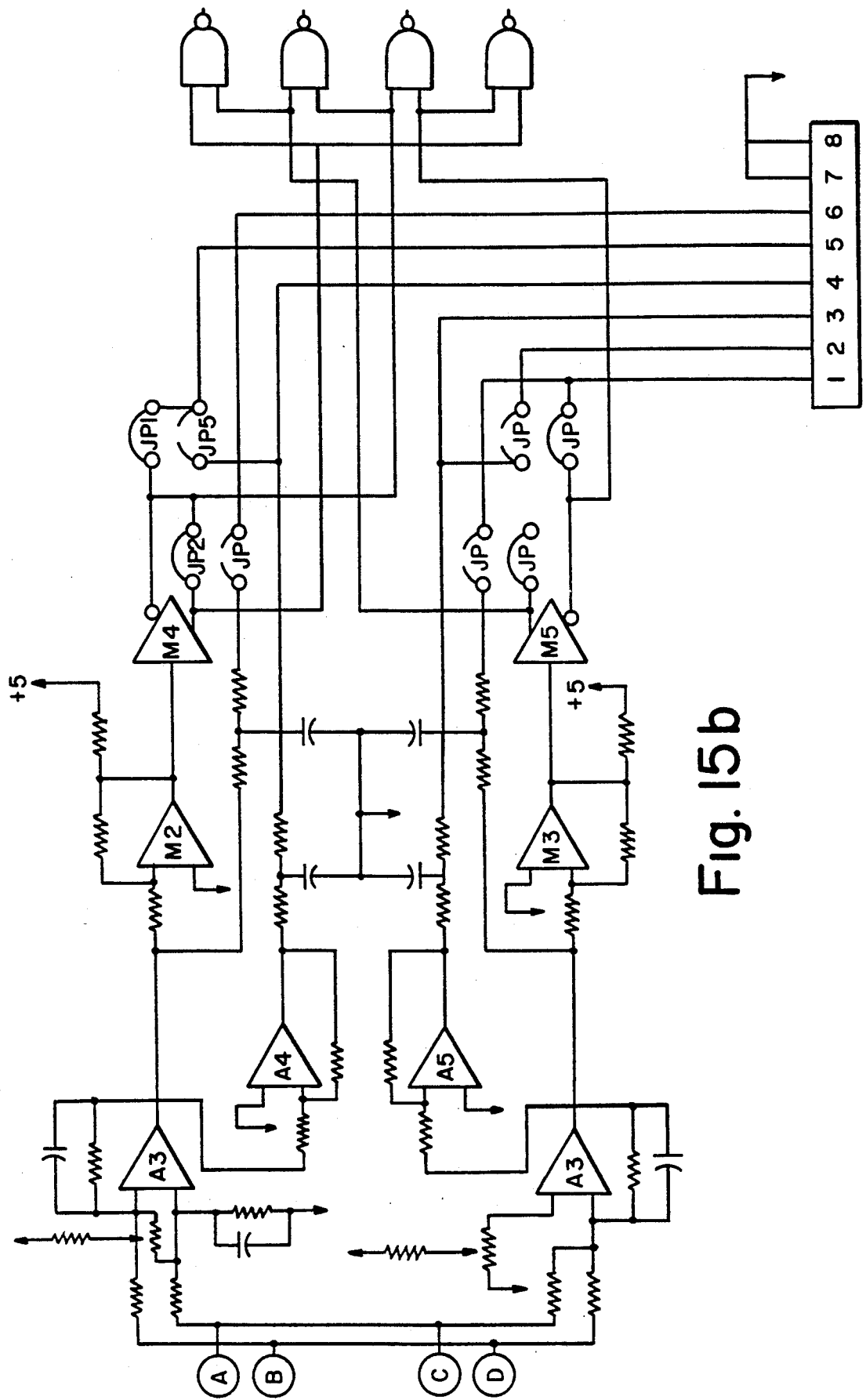

Referring to FIG. 15, the circuit illustrated therein is similar to the circuit illustrated in FIG. 18. The sensor is a quad sensor. Switches SW2-1 and SW2-2 are thrown to convert the sensor to a dual sensor with adjacent quadrants tied together. Hence, the sensor can have two orientations rotated apart by 90°. Op amp A2 provides a difference of the sensor signals. Op amp A3 provides a sum of the sensor signals. Op amps M2 and M3 are comparators and Op amps M4 and M5 are squaring circuits. The Op amps A4 and A5 are inverters used when a sine wave output is desired. Depending upon the selection of jumpers, the output will be differential square wave signals for each quadrature signal or differential sine wave signals for each quadrature signal. The four AND gates are used to drive LED's (not shown) which light in sequence as the interferometer detects motion. The sequence in which the LED's light up is indicative of the direction of motion.

Figure 16A:
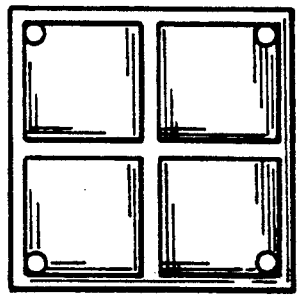
FIGS. 16a and 16b illustrate a quad light sensor suitable for the practice of this invention.
Figure 16B:
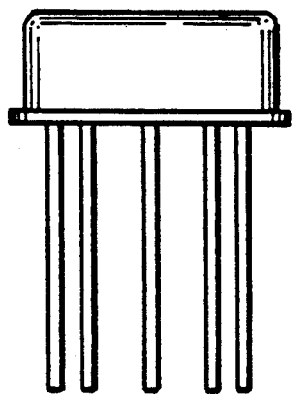

FIGS. 16a and 16b show a quadrant-type detector suitable for use in the practice of this invention. It is sold by Hamamatsu as Model S994-13 in a TO-5 package. The individual size of the four sensitive surfaces is $1.45 \times 1.45$ mm. Note that the critical dimension $s_d$ for this detector is 0.1 mm.

Having thus defined the invention in the detail and particularity required by the Patent Laws what is claimed and desired to be protected by Letters Patent is set forth in the following claims.

I claim:

1. A stable single-frequency laser interferometer for measuring a distance comprising:
 a) power stabilized lasing means for providing a stable coherent single-frequency first light beam,
 b) means for splitting the first light beam to form a reference beam and a measurement beam and for directing the reference beam along a reference path having a fixed optical distance, there being a reference retro prism in said reference path, and for directing the measurement beam along a measurement path the optical distance of which varies with the distance being measured, there being a measurement retro prism in said measurement path,
 c) a dual light sensor comprising two closely spaced very small sensor surfaces mounted in substantially the same plane,
 d) means including said splitting means for recombining the measurement and reference beams to form a single fringe pattern where they overlap over the dual sensor, and
 e) means to adjust the effective convergent angle of the recombining beams to have a sufficiently large effective convergent angle to promote stability and whereby the output signals of the two sensors are brought into phase quadrature.

2. The interferometer according to claim 1 wherein the means to adjust the effective convergent angle rotates the dual light sensor and/or a retro prism.

3. The interferometer according to claim 1 wherein the power stabilized lasing means is a helium-neon laser.

4. The interferometer according to claim 2 wherein the convergent angle of the recombining means is at least 0.1 mRad.

5. The interferometer according to claim 3 wherein the sensors have areas of less than about 1.3 mm square and with a spacing therebetween of less than 0.35 mm.

6. The interferometer according to claim 3 wherein the dual light sensor is a quad sensor and means are provided for connecting the four sensors to provide two pairs of sensors each pair having a common output and such that the orientation of the pairs of sensors can be rotated 90° by altering the selected pairs whereby the quadrature signals derived from the single fringe may be improved.

7. A stable single-frequency laser interferometer for measuring a distance comprising:
 a) power stabilized lasing means for providing a stable coherent single-frequency first light beam,
 b) means for splitting the first light beam to form a reference beam and a measurement beam and for directing the reference beam along a reference path having a fixed optical distance and for directing a measurement beam along a measurement path the optical distance of which varies with the distance being measured,
 c) a dual light sensor comprising two closely spaced very small sensor surfaces mounted in substantially the same plane,
 d) means for recombining the measurement and reference beams to form a single fringe where they overlap over the dual sensor,
 e) convergence means to adjust the effective convergent angle of the recombining beams at an angle of at least 0.1 mRad, and
 f) means to rotate the plane of the dual light sensor whereby with adjustment of the convergence means and the rotation means the output signals of the two sensors can be brought into phase quadrature.

8. The interferometer according to claim 7 wherein the power stabilized lasing means is a helium-neon laser.

9. The interferometer according to claim 8 wherein the sensors have areas of less than about 1.3 mm square and with a spacing therebetween of less than 0.35 mm.

10. The interferometer according to claim 1 or 7 wherein the first light beam radius is selected so that the Rayleigh threshold of the measurement beam falls approximately midway between the outer limits of travel of the measurement retro prism and the length of the reference beam is substantially equal to the length of the Rayleigh divergence threshold.

11. A stable single-frequency laser interferometer for measuring a distance comprising:
 a) power stabilized lasing means with collimating lens components for providing a stable coherent expanded single-frequency first light beam,
 b) means for splitting the first light beam to form a reference beam and a measurement beam and for directing the measurement beam along a reference path having a fixed optical distance, there being a reference retro prism in said reference path, and for directing the measurement beam along a measurement path the optical distance of which varies with the distance being measured, there being a measurement retro prism in said measurement path,
 c) a dual light sensor comprising two closely spaced very small sensor surfaces mounted in substantially the same plane,
 d) means including said splitting means for recombining the measurement and reference beams to form a single fringe where they overlap over the dual sensor, and
 e) means to adjust the effective convergent angle of the recombining beams to have a sufficiently large effective convergent angle to promote stability and whereby the output signals of the two sensors are brought into phase quadrature.

12. The interferometer according to claim 11 wherein the means to adjust the effective convergent angle comprises means for rotating the beam splitter.

13. The interferometer according to claim 11 wherein the power stabilized lasing means is a helium-neon laser.

14. The interferometer according to claim 11 wherein the convergent angle of the recombining beams is at least 0.1 mRad.

15. The interferometer according to claim 11 wherein the sensors have areas of less than about 1.3 mm square and with a spacing therebetween of less than 0.35 mm.

16. The interferometer according to claim 11 wherein the dual light sensor is a quad sensor and means are provided for connecting the four sensors to provide two pairs of sensors each pair having a common output and such that the orientation of the pairs of sensors can be rotated 90° by altering the selected pairs whereby the quadrature signals derived form a single fringe may be improved.

* * * * *

UNITED STATES PATENT AND TRADEMARK OFFICE
CERTIFICATE OF CORRECTION

PATENT NO.    :  5,018,862
DATED         :  May 28, 1991
INVENTOR(S)   :  Marc F. Aiello It is certified that error appears in the above-identified patent and that said Letters Patent is hereby corrected as shown below:

Column 3 Line 8 "patter" should read --pattern--.

Claim 4 Line 34 Column 13 "means" should read --beams--.

Signed and Sealed this

Fifteenth Day of December, 1992

*Attest:*

DOUGLAS B. COMER

*Attesting Officer*    Acting Commissioner of Patents and Trademarks